No. 816,735. PATENTED APR. 3, 1906.
H. PENTHER.
APPARATUS FOR SEPARATING RUBBER FROM CANVAS, METAL, AND OTHER MATERIAL.
APPLICATION FILED DEC. 28, 1904.

5 SHEETS—SHEET 3.

Witnesses:
Inventor:
Hermann Penther

No. 816,735. PATENTED APR. 3, 1906.
H. PENTHER.
APPARATUS FOR SEPARATING RUBBER FROM CANVAS, METAL, AND OTHER MATERIAL.
APPLICATION FILED DEC. 28, 1904.
5 SHEETS—SHEET 4.
Fig. 4.
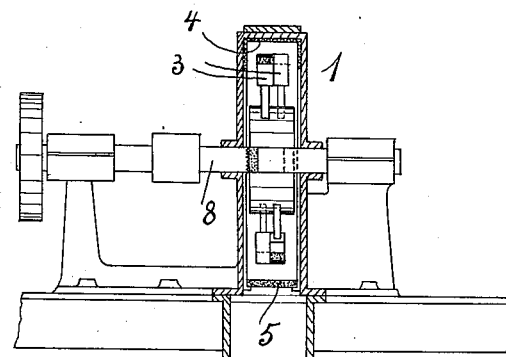
Fig. 5.
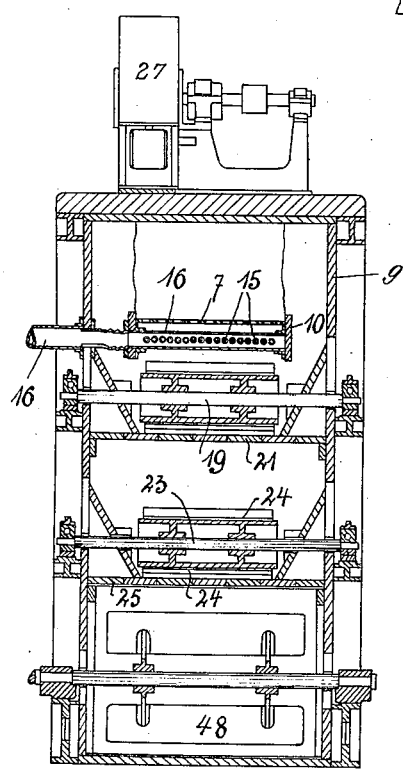
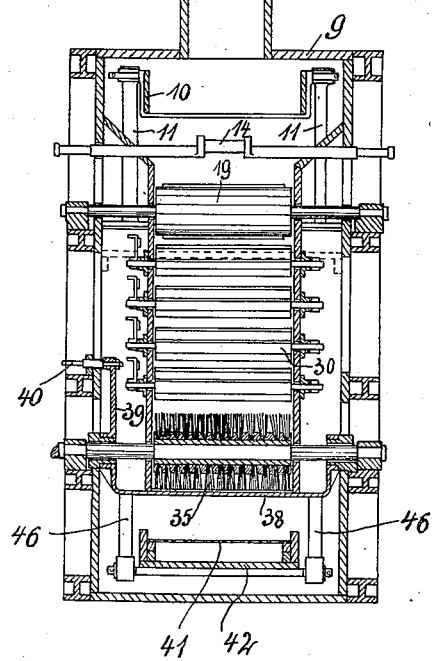
Witnesses:
Inventor:
Hermann Penther
by Frank W. Brierer Atty.

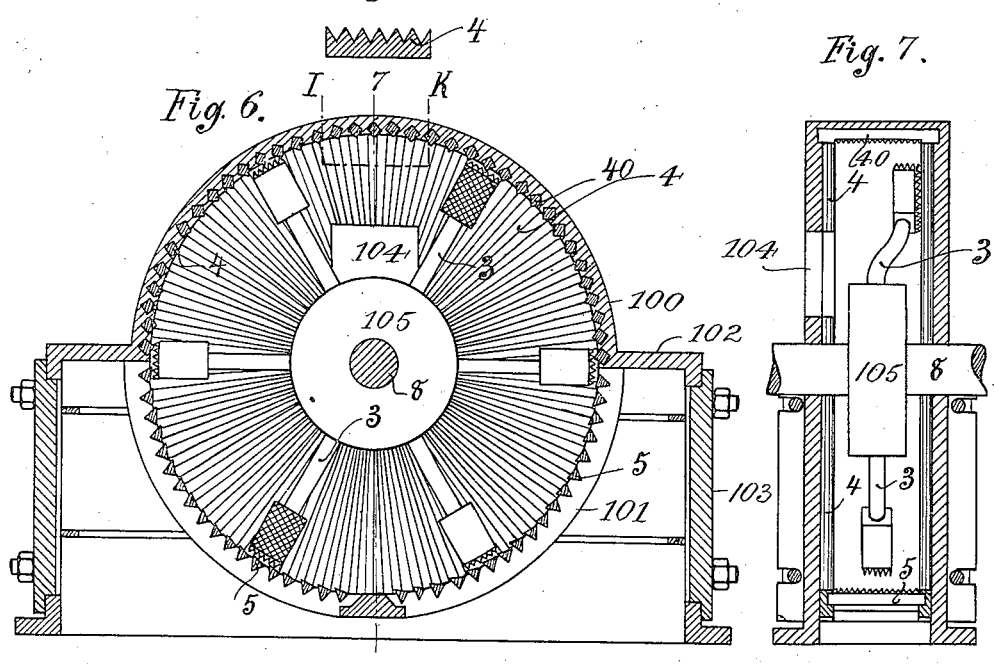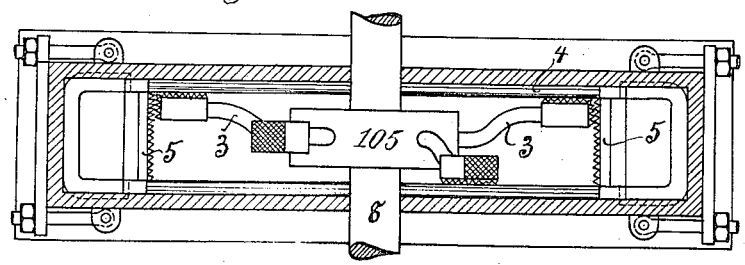

UNITED STATES PATENT OFFICE.

HERMANN PENTHER, OF HANOVER, GERMANY.

APPARATUS FOR SEPARATING RUBBER FROM CANVAS, METAL, AND OTHER MATERIAL.

No. 816,735. Specification of Letters Patent. Patented April 3, 1906.

Application filed December 28, 1904. Serial No. 238,644.

*To all whom it may concern:*

Be it known that I, HERMANN PENTHER, a citizen of Germany, residing at Hanover, Germany, have invented certain new and useful Improvements in or Relating to Apparatus for Separating Rubber from Canvas, Metal, and other Materials, of which the following is a specification.

This invention relates to an apparatus for effecting the complete separation of rubber, more particularly of rubber-waste, from canvas, metal, or the like insertions or backing connected to it.

The apparatus comprises, essentially, a tearing device by means of which the foreign substances—such as canvas, metal, and the like—are first torn from the rubber proper and a series of screening and sorting devices of special construction.

A construction of the apparatus according to this invention is illustrated by way of example in the accompanying drawings, of which—

Figure 1:
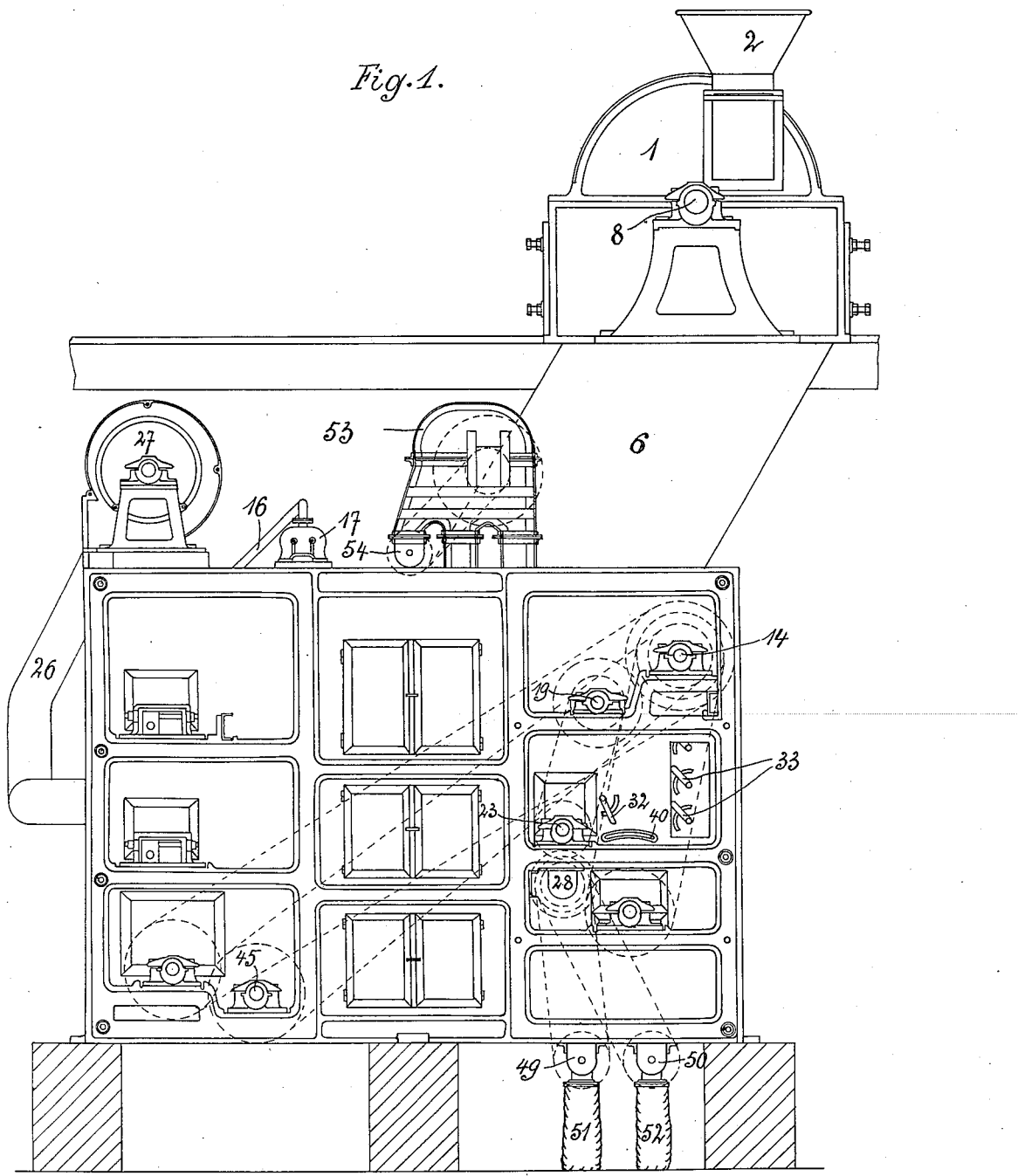
Figure 2:
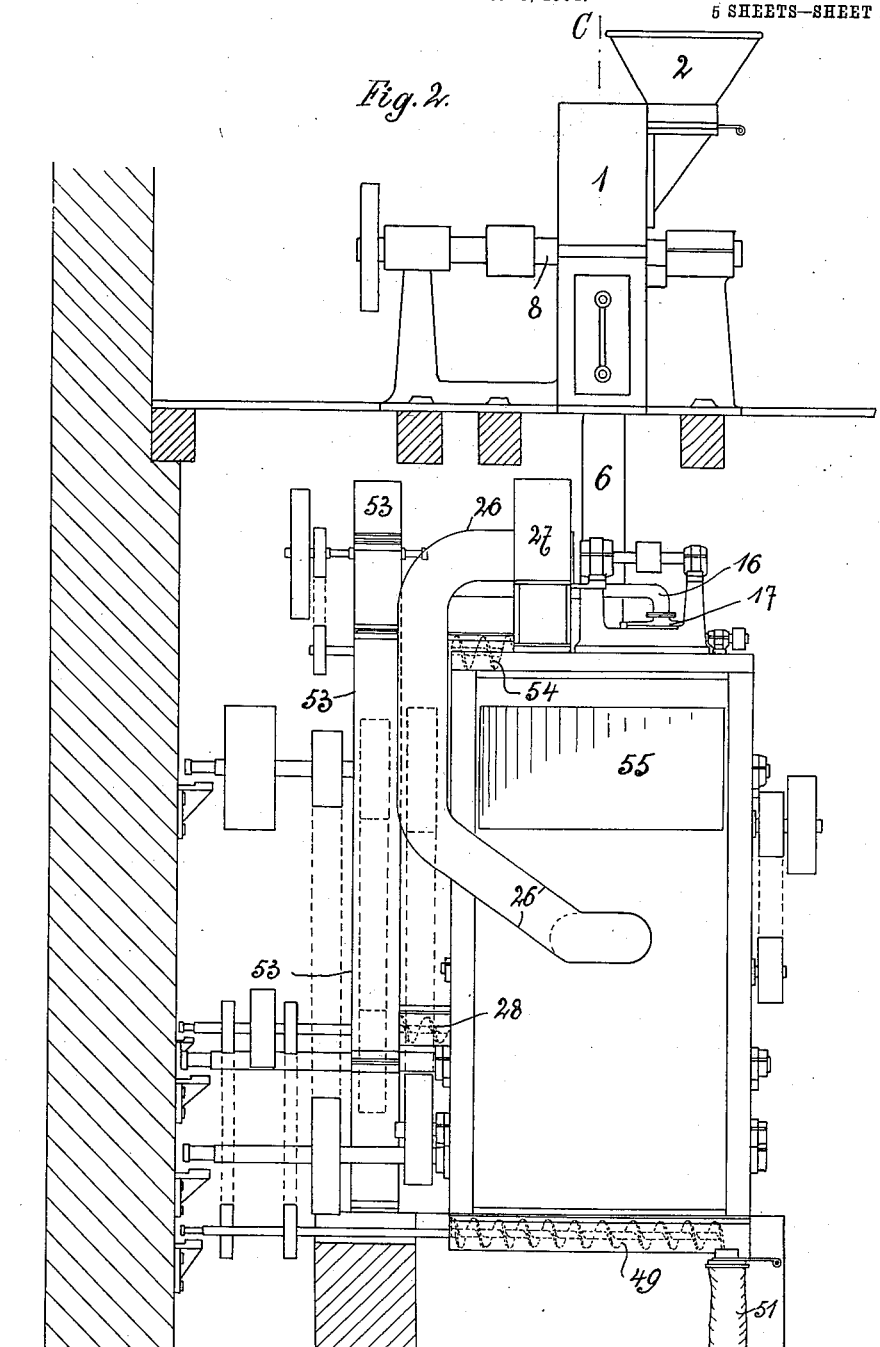
Figure 3:
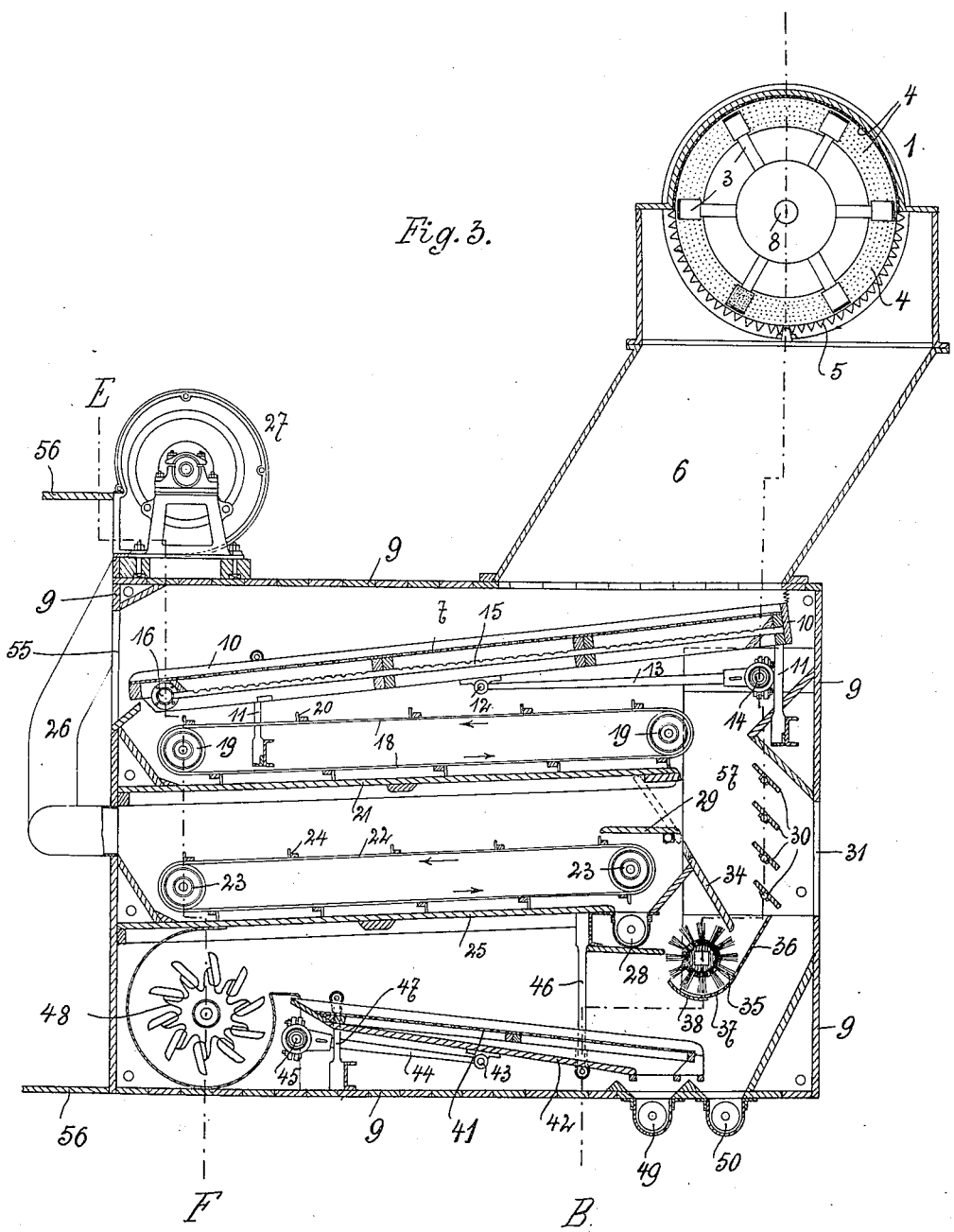

Figure 1 is a side elevation; Fig. 2, a front elevation; Fig. 3, a section on the line C D of Fig. 2; Fig. 4, a section on line A B of Fig. 3; Fig. 5, a section of E F of Fig. 3. Fig. 6 is a vertical cross-section of the reducing or tearing mechanism; Fig. 7, a vertical section on line 7 7, Fig. 6; Fig. 8 a plan, partly in section, thereof; and Fig. 9, a section on line I K, Fig. 6.

The reducing or tearing mechanism consists of a cylindrical drum composed of an upper solid section 100 and a lower open section 101. The drum is supported by a plate 102, that constitutes the cover for a casing 103. The upper solid section 100 is provided on its inner side with a series of squared bars 40, having toothed reducing edges. The lower open section 101 is provided with spaced triangular reducing-bars, between which the ground material is free to escape into a hopper 6. The end walls 4 of the casing are provided with inner burs or corrugations, one of said walls having an inlet 104. Through the drum extends a rotatory shaft 8, upon which is fast the hub 105 of the serrated beaters 3. From the bottom of the tearing mechanism a passage or chute 6 leads into the casing 9, surrounding the screening and sorting device. In the upper portion of this casing is arranged an inclined upper shaking screen or sieve 7, (see Figs. 3 to 5,) provided with fairly-large openings. The frame 10 of this screen is supported by spring-brackets 11 and is further connected to an eccentric shaft 14 by means of a hinge 12 and connecting-rod 13. The frame 10 also carries a tubular grating 15, arranged under the sieve 7 and formed of a number of closely-arranged pipes provided at the top with small holes and all merging into a main inlet-pipe 16. As will be seen in Fig. 1, this inlet-pipe is connected to a fan 17.

Under the sieve 7 and grating 15 is an endless upper conveyer-band traveling over rollers 19. On the outer surface of the said band are secured ledges 20 of such height that they fill up the space between the lower part of the band 18 and the platform 21 under it. Under this first conveyer is a second lower conveyer 22, the band of which traveling over the rollers 23 is also provided with ledges 24, touching the platform 25. The space between the platforms 25 and 21 is connected, by means of a pipe 26, to an exhauster 27. At one end of the platform 25 and the conveyer 22 a worm 28 is arranged, and at the same end of the platforms 21 and 25 an adjustable flap-valve 29 is provided. In front of this valve is arranged a second valve 30, formed of four adjustable flaps. The valve 29 can be operated from the outside by means of a lever 32, as shown in Fig. 1, while the valve 30 is operated by means of a lever 33.

The valve 29 is connected to an inclined plane 34, under which is arranged a bristle-drum 35. A separate inclined plane 36 leads to this bristle-drum, and this plane 36 is provided with a semicircular extension 37 in contact with the ends of the bristles. This bent part 37 can be lengthened or shortened by the aid of a suitably-shaped continuation-piece 38, which is pivoted, as shown in Fig. 4, and adjustable by means of a lever 39 and the pin 40, projecting through the casing. (See Fig. 1.)

Below the platform 25 and above the bottom of the casing 9 an inclined lower shaking sieve 41 is provided, the inclined bottom 42 of which is connected to the eccentric shaft 45 by means of a hinge 43 and connecting-rod 44. The sieve 41, with its bottom 42, is supported at one end by elastic rods 46 and at the other end by elastic rods 47. A fan 48 is arranged at one end of the said sieve, while at the other end two conveyer-worms 49 and 50 are provided, the casings of which lead into the reservoirs 51 and 52, Figs. 1 and 2.

Outside the casing 9 is a bucket-elevator or hoist 53, the bottom portion of the casing of which communicates with the casing surrounding the previously-mentioned worm 28, Figs. 2 and 3, while the upper end of said elevator is connected to the casing of a conveyer-worm 54, Figs. 1 and 2. This conveyer-worm 54 is arranged on the cover of the casing 9, which is provided at one place with an opening connecting the casing of the worm 54 with the space above the highest screening device 7 15.

The working of the apparatus is as follows: The rubber to be separated from canvas or metal insertions or backing is introduced through the hopper 2 into the tearing device 1. The rotating arms 3 seize the material, and while the points or teeth of the inner surface 4 of the casing and the grating 5 have the tendency to hold the rubber articles fast the points or teeth of the arms tear the particles of metal or canvas away from the rubber. The parts separated from each other fall through the slots of the grating 5 and pass through the chute 6 to the sieve 7, the openings of which increase in size toward the lower end and are sufficiently large to permit all the particles of rubber falling on the sieve to pass through. The light particles or fibers of canvas are carried upward by the current of air produced by the fan 17 and escape through the openings of the tubular grating 15, their passage through the openings of the sieve 7 being thus in all cases prevented. The particles of fibers of canvas pass finally through the opening 55, situated in the wall of the casing 9 at the end of the sieve 7, into a dust-collecting chamber, a portion of which is shown at 56, Fig. 3. All the heavier rubber particles, together with the larger canvas fibers and metal particles, fall through the sieve 7 and the slots of the tubular grating 15 upon the conveyer-band 18, which travels in the direction indicated by the arrows and feeds the whole material into the well 57, Fig. 3. During the descent of the material down this well currents of air produced by the exhauster 27 and entering through the flap-valves 30 take up the specifically lighter portion of the material and carry it into the chamber containing the conveyer-band 22. These lightest particles or fibers are conveyed through the suction-pipe 26 to the exhauster 27 and thence into the dust-collecting chamber 56, while the heavier particles (rubber and coarser fibers, as well as particles of metal) are conveyed by the band 22, traveling in the direction of the arrow, to the conveyer-worm 28, which conveys the said material to the elevator 53, Fig. 2. This elevator 53 raises the material and drops it into the casing of the worm 54, by which it is again conveyed through the opening in the upper cover of the casing 9 to the upper sieve 7, so that the screening and sorting operation just described can again take place. The flap-valves 29 and 30 can be set in accordance with the kind of material to be treated in such manner as to produce in the well 57 horizontal currents of the desired strength. All heavy material not taken up by the above-mentioned air-currents falls down the well 57 and is conveyed by the inclined planes 34 and 36 to the drum 35, provided with springy bristles, which brushes the material into the space above the sieve 41. A current of air generated by the fan 48 acts upon the particles so projected into the said space, and as a consequence all particles of greater specific gravity, more particularly the completely-cleaned rubber, fall upon the sieve 41 and pass through its openings upon the oblique bottom 42. They finally pass, owing to the shaking of the whole apparatus, to the worm 49, which conveys the completely-cleaned rubber into the reservoir 51. The lighter particles and incompletely-cleaned material are conveyed by the air-currents and the sieve 41 to the worm 50 and from the latter to the reservoir 52. This unfinished material can be again brought from the reservoir 52 into the tearing device 1 and repassed through the whole apparatus. In this way the rubber is completely separated from foreign substances connected to it.

The upper sieve 7 can be provided at its lower end with larger openings, so as to leave the material falling on the sieve exposed to the action of air-currents for as long time as possible and to finally enable all specifically heavier parts to fall through the sieve.

What I claim is—

1. In a machine for separating rubber from foreign substances, the combination of a screen, with a pair of conveyers below the same, means for inducing an air-current between the conveyers, and means for returning the lighter material from below the lower conveyer to the screen, substantially as specified.

2. In a machine for separating rubber from foreign substances, the combination of a screen, with a pair of conveyers and a well below the screen, means for inducing a current of air through the well and between the conveyers, and a brush at the bottom of the well, substantially as specified.

3. In a machine for separating rubber from foreign substances, the combination of an upper screen, with a pair of conveyers and a well below the screen, means for inducing a current of air through the well and between the conveyers, a lower screen, means for returning the lighter particles from below the lower conveyer to the upper screen, and means for carrying the heavier particles from the bottom of the well to the lower screen, substantially as specified.

4. In a machine for separating rubber from foreign substances, the combination of means for tearing the rubber, with an upper reciprocating screen, means for blowing air through said screen, a pair of conveyers and a well below the screen, means for inducing a current of air through the well and between the conveyers, a lower screen, means for returning the lighter particles from below the lower conveyer to the upper screen, and means for carrying the heavier particles from the bottom of the well to the lower screen, substantially as specified.

Signed by me at Hanover, Germany, this 9th day of December, 1904.

HERMANN PENTHER.

Witnesses:
 LEONORE RASCH,
 ANNA DIPPELL.